United States Patent [19]

Kato

[11] Patent Number: 4,958,359
[45] Date of Patent: Sep. 18, 1990

[54] COMMUNICATION APPARATUS

[75] Inventor: Ichiro Kato, Tokyo, Japan

[73] Assignee: Canon Kabushiki Kaisha, Tokyo, Japan

[21] Appl. No.: 203,084

[22] Filed: Jun. 7, 1988

[30] Foreign Application Priority Data

Jun. 9, 1987 [JP] Japan .................................. 62-142155

[51] Int. Cl.⁵ ............................................ H04K 1/02
[52] U.S. Cl. ........................................... 375/1; 380/34
[58] Field of Search ................................ 375/1; 380/34

[56] References Cited

U.S. PATENT DOCUMENTS

| | | | |
|---|---|---|---|
| 4,538,280 | 8/1985 | Mosley, Jr. et al. | 375/1 |
| 4,583,231 | 4/1986 | Puckett | 375/1 |
| 4,630,283 | 12/1986 | Schiff | 375/1 |
| 4,639,932 | 1/1987 | Schiff | 375/1 |
| 4,641,322 | 2/1987 | Hasegawa | 375/1 |

Primary Examiner—Salvatore Cangialosi
Attorney, Agent, or Firm—Fitzpatrick, Cella, Harper & Scinto

[57] ABSTRACT

A spread communication system comprising a receiver, a diffusion convertor for converting a signal from the receiver, a control signal generator for generating a control signal representing an output level of the diffusion convertor, another diffusion converter for converting data to be transmitted, a transmitter for transmitting data from the another diffusion convertor and a transmission controller for controlling a transmission level of the transmitter in accordance with the control signal from the control signal generator.

15 Claims, 5 Drawing Sheets

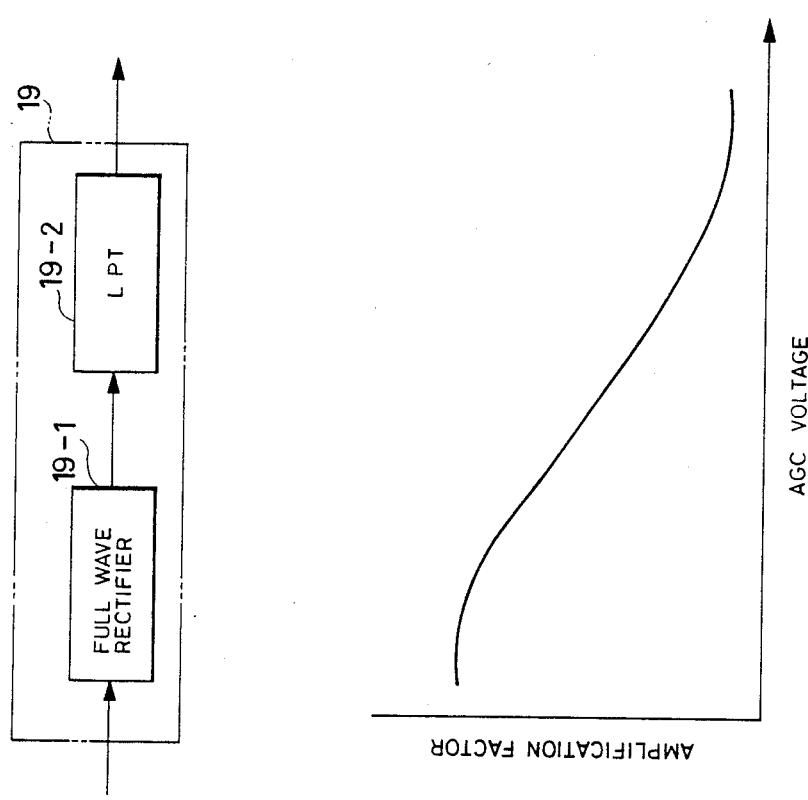

COMMUNICATION APPARATUS

BACKGROUND OF THE INVENTION

1. Field of the Invention

The present invention relates to a communication apparatus, and more particularly to a wireless communication apparatus.

2. Related Background Art

A spectrum diffusion (spread spectrum) communication system has been known as one of a plurality of communication systems. In the spectrum diffusion communication system, a transmitting station converts a base band signal of source data to be transmitted, such as digital audio/video data, to a base band signal having a much wider band width than that of the source data, by using a diffusion (spread) code such as a pseudo noise code. The converted signal is modulated by PSK or FSK modulation system into a high frequency signal, which is then transmitted.

A receiving station demodulates the source data by reverse-diffusion (reverse-spread) which correlates with the received signal by using the same diffusion code as that used in the transmitting station.

An outline of the spectrum diffusion communication is explained with reference to FIGS. 1 to 3.

A source data d(t) applied to a multiplier 6-1 in the transmitting station has a waveform shown by        in FIG. 2, and a spectrum shown by        in FIG. 3.

A diffusion code P(t) which is another input signal to the multiplier 6-1 of FIG. 1 has a waveform shown by        in FIG. 2 and a spectrum shown by        in FIG. 3. Since the diffusion code P(t) varies much more violently than the source data d(t), the spectrum        in FIG. 3 has a much wider band than the spectrum        .

The data d(t) is multiplied by the diffusion code P(t) by the multiplier 6-1 of FIG. 1 so that it is diffused (spread). The output of the multiplier 6-1 has a waveform shown by        in FIG. 2 and a spectrum shown by        in FIG. 3 which has a substantially equal band width to that of the spectrum        . The output signal of the multiplier 6-1 is mixed by a mixer 6-2 with a carrier generated by a local oscillator 6-3. A waveform of the carrier is shown by        in FIG. 3. The output of the mixer 6-2 has a waveform shown by        in FIG. 2 and a spectrum shown by        in FIG. 3, and it is sent via an antenna 6-3.

In the receiving station, the spectrum of the signal received via an antenna 6-5 of FIG. 6 usually includes the desired signal sent from the transmitting station as well as various signals as shown by        in FIG. 3. They include noises, signals sent by other stations and a narrow band interference signal. The received signal including those signals is mixed by a mixer 6-6 with the same diffusion code P(t) as that used in the transmitting station, and it is converted to a signal having a spectrum shown by        in FIG. 8. Namely, the desired signal in the received signal which corresponds to the diffusion code P(t) is reverse-diffused (reverse-spread) and the band width thereof is narrowed in accordance with the band width of the source data. On the other hand, undesired signal, that is, the signal from other station having no identical diffusion code or narrow band interference signal is diffused and converted to a wide band signal.

The diffusion code used for modulation and demodulation is set such that mutual correlation in each communication channel is sufficiently small. Accordingly, when a signal diffused (spread) by a different code is demodulated by reverse-diffusion, it becomes a wide band noise. As a result, only the desired signal can be extracted. Accordingly, multi-connection by code division is attained. Namely, a common frequency may be shared by a plurality of communication channels.

The output signal of the mixer 6-6 is applied to a band-pass filter 6-7 having a band width corresponding to the band width of the source data so that it is converted to a narrow band signal having a spectrum shown by        in FIG. 3. The narrow band signal is demodulated such as by PSK demodulation by a demodulator 6-8 of FIG. 1 to reproduce the source data.

When a number of moving (mobile) radio stations conduct multi-connection by the code division to a multi-connection apparatus which is a single fixed station, the following problem arises. An electric field strength received by the fixed station is higher as the signal is sent from a nearer moving (mobile) station to the fixed station. Accoridngly, when the signal sent from a distant moving station is demodulated, the signal sent from a nearby moving station functions as a wide band noise but an electric field strength thereof is much higher than that of the signal from the distant moving station and a noise power which is supplied to an intermediate frequency filter 5 is unneglegibly large. Thus, in the prior art, the performance of the multi-connection is significantly deteriorated by the distance between the radio stations.

SUMMARY OF THE INVENTION

It is an object of the present invention to provide a communication apparatus which can effect exact communication regardless of distance between communication apparatus.

It is another object of the present invention to provide a communication apparatus which can communicate without disturbing other communication.

It is a further object of the present invention to provide a communication apparatus which can communicate without consuming unnecessary power.

It is still a further object of the present invention to provide a spectrum diffusion communication apparatus which resolves a problem of distance and allows multi connection.

The above and other objects and advantages of the present invention will be apparent from the following description of the invention.

BRIEF DESCRIPTION OF THE DRAWINGS

FIG. 5 shows a block diagram of an AGC voltage generator shown in FIG. 4, FIG. 6 shows a relationship between an AGC voltage and an amplification factor in variable gain amplifiers 4 and 13.

DETAILED DESCRIPTION OF THE PREFERRED EMBODIMENTS

Figure 4:
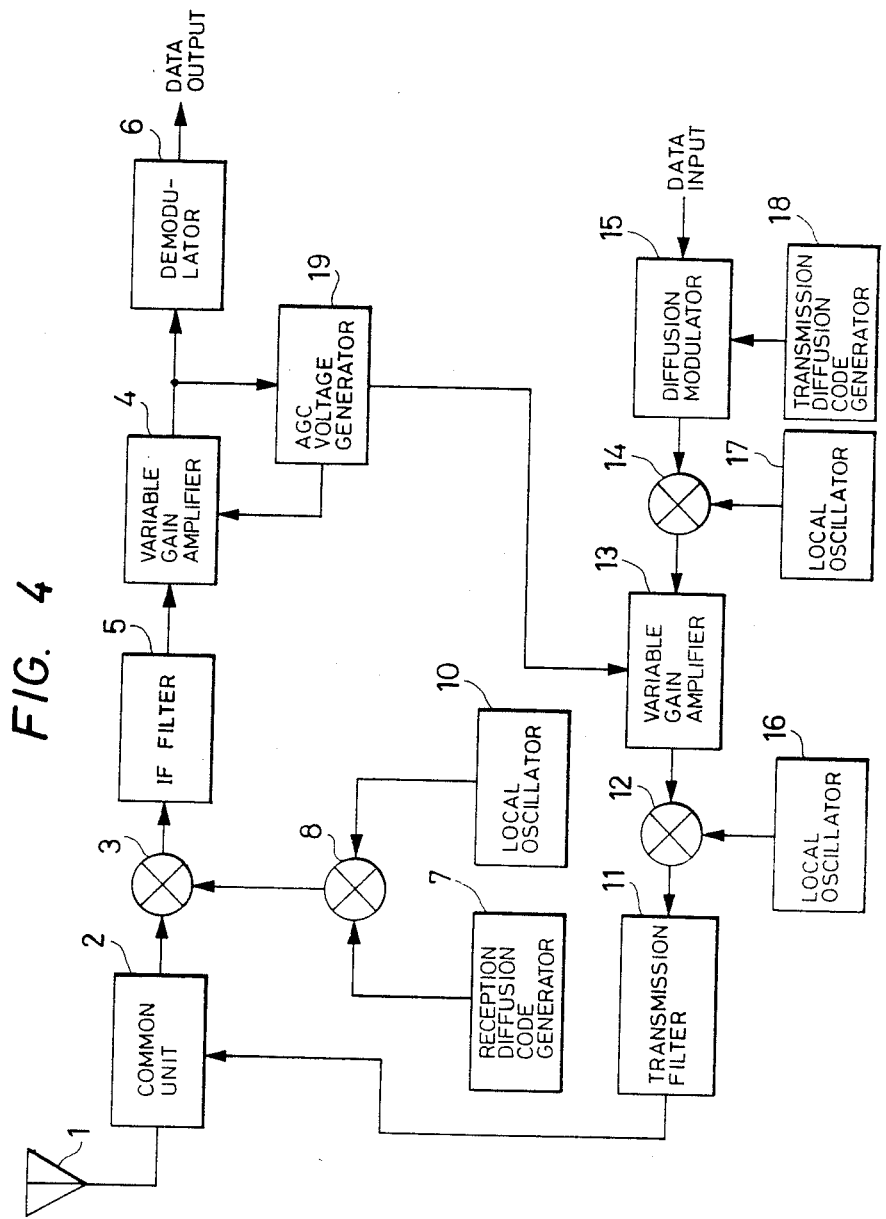
FIG. 4 shows a block diagram of one embodiment of the present invention.

FIG. 4 shows a block diagram of a spectrum diffusion communication apparatus in accordance with the present invention. A transmitter is first explained.

Source data, which here is digital data, is diffusion-modulated (spread-modulated) by a diffusion (spread) modulator 15 by using a predetermined diffusion code generated by a code generator 18. The output of the diffusion modulator 15 is multiplied by a mixer 14 with a signal of a predetermined frequency generated by a local oscillator 17. Accordingly, the output of the mixer 14 has a predetermined intermediate frequency and it is amplified by a variable gain amplifier 13. The output of the variable gain amplifier 13 is frequency converted by the mixer 12 and the local oscillator 16.

The output of the mixer 12 is supplied to a filter 11 where only a required band component is extracted and it is transmitted from an antenna 1 through a common unit 2.

In a receiver, a received signal from the common unit 2 is supplied to a mixer 3. Another input to the mixer 3 is a signal mixed by a mixer 8, which receives a predetermined diffusion code generated by a diffusion code generator 7 and a signal generated by a local oscillator 10. The local oscillator 10 generates a signal of a frequency which is shifted from a receiving frequency (frequency of carrier of a desired signal) by the intermediate frequency.

If the diffusion codes used in the transmitter and receiver for modulation and demodulation are phase-synchronized, an intermediate signal having a band width corresponding to the source data is produced at the output of the mixer 3. The output of the mixer 3 is supplied to an intermediate frequency filter 5 which has a band width corresponding to the source data. An intermediate frequency signal produced by the intermediate frequency filter 5 is amplified by a variable gain amplifier 4 and the output of the variable gain amplifier 4 is applied to a demodulator 6 which demodulates the source data.

The variable gain amplifier 4 voltage-controls its gain by an AGC (automatic gain control) voltage generated by an AGC voltage generator 19, which receives the output of the variable gain amplifier 4 and controls the amplifier 4 to keep a level thereof constant.

A gain of the variable gain amplifier 13 of the transmitter is also controlled by the AGC voltage generated by the AGC voltage generator 19 provided in the receiver.

In an initial state, that is, when communication between stations has not been established, the received signal is diffused by the diffusion code generated by the diffusion code generator 7 of the receiver. Accordingly, the output of the intermediate frequency filter 5 is small and the AGC voltage generator 19 controls to increase the gains of the variable gain amplifiers 4 and 13.

If a signal from another station corresponding to the receiving channel, that is, a signal corresponding to the diffusion code generated by the receiver diffusion code generator 7, is applied to the antenna 1, the output of the intermediate frequency filter 5 increases after the phase synchronization of the diffusion codes for the modulation/demodulation has been established. As a result, the output signal of the amplifier 4 increases and the AGC voltage generator 19 controls the gain of the variable gain amplifier 4 so that the output of the variable gain amplifier 4 is kept at an appropriate level. The AGC voltage also controls the transmitter variable gain amplifier 13. The AGC voltage generator 19 determines a distance to the other station by the level of the received signal. If it determines that the distance is short, it lowers the level of the transmitting signal in accordance with the distance. For a near station, the transmitting signal level is low, and for a distant station, the transmitting signal level is high. Accordingly, the electric field strength at the antenna of the other station is of proper level.

On the other hand, when the signal is to be sent from the present station to the other station, the gain of the variable gain amplifier 13 is initially controlled to a high level as described above. Accordingly, the electric field strength at the antenna of the other station is unduly high. However, as the other station responds, the input signal to the AGC voltage generator 19 increases. As a result, the AGC voltage generator 19 controls the gain of the variable gain amplifier 13 such that the electic field strength at the antenna of the other station is at the proper level.

FIG. 5 shows a configuration of the AGC voltage generator 19. Numeral 19-1 denotes a full wave rectifier and numeral 19-2 denotes a low pass filter.

FIG. 6 is a graph showing a relationship between the AGC voltages in the variable gain amplifiers 4 and 13 and the amplification factor. Scales of the ordinates for the variable gain amplifiers 4 and 13 are not necessarily equal.

A manner of control of the transmitting output by the reverse-diffusion demodulated output of the received signal is explained in detail.

When there is no other station signal corresponding to the receiving channel, the output of the intermediate frequency filter 5 of FIG. 4 includes only a narrow band noise and it is of low power. The output of the intermediate frequency filter 5 is amplified by the variable gain amplifier 4 and the output of the amplifier 4 is applied to the full wave rectifier 19-1 of FIG. 6. Only a DC component is extracted by the low pass filter 19-2 and it is supplied to the variable gain amplifiers 4 and 13 of FIG. 4 as the AGC voltage. Since the output of the intermediate frequency filter 5 is now of low power, the AGC voltage is also low. Because of low AGC voltage, the amplification factors of the variable gain amplifiers 4 and 13 are large as shown in FIG. 6.

When the other station signal corresponding to the receiving channel is received and the synchronization is established, the reverse-diffusion demodulated output of the received signal appears, in addition to the noise, at the output of the intermediate frequency filter 5 of FIG. 4. Accordingly, the output of the intermediate frequency filter 5 has a power corresponding to the strength of the reverse-diffusion demodulated output of the received signal. The output of the intermediate frequency filter 5 is amplified by the variable gain amplifier 4, and the output of the amplifier 4 is applied to the full wave rectifier 19-1 and the low pass filter 19-2 of FIG. 5 which convert it to a DC voltage signal corresponding to the strength of the reverse diffusion demodulated output, and outputs it as the AGC voltage. The amplification factor of the variable gain amplifier 4 of FIG. 4 lowers as the AGC voltage rises.

In the manner, this amplification factor of the variable gain amplifier 4 is controlled by the receiver variable gain amplifier 4 and the AGC voltage generator 19 which reversely feeds back to the amplifier 4. The AGC voltage varies to control the amplification factor in accordance with the input to the variable gain amplifier 4 so that the output of the amplifier 4 is kept constant. Except for a transient state, the AGC voltage always reflects the strength of the reverse-diffusion demodulated output of the received signal.

The AGC voltage is supplied to the transmitter variable gain amplifier 13 having the same characteristic as the variable gain amplifier 4 so that the amplification factors of the variable gain amplifiers 4 and 13 are proportional to each other. This means that the reverse diffusion demodulated output of the received signal is always inversely proportional to the transmission output.

Thus, if the communicating stations are configured as shown in FIG. 5, the transmitting power is controlled such that the electric field strength at the antenna of the receiving station is at the proper level. Accordingly, since the electric field strength at the antenna of the receiving station is always kept at the proper level and the problem of distance caused by different distances between the stations is solved. When only the moving stations are configured as shown in FIG. 5, the above advantage is attained.

When a plurality of moving stations are multi-connected through a single fixed station, up-lines from the moving stations to the fixed station and down-lines from the fixed station to the moving stations usually have different carrier frequencies. Accordingly, the up-lines and the down-lines may be separately designed. The distance to the fixed station differs from moving station to moving station. For the up-lines, if the transmission outputs of the plurality of moving stations are equal, the transmission output from a very distant station is very weak compared to other moving stations. Accordingly, the source data from the distant station may not be reproduced. On the other hand, for the down-lines, since the transmission outputs of the fixed station for the plurality of moving stations are equal, each moving station receives the transmission signals to all moving stations as the same level inputs. Since the number of moving stations to which one fixed station transmits the signals is limited, each moving station can reproduce the source data from the desired signal. In this manner, the problem of distance is avoided for the down line.

Accordingly, in such a multi-connection communication, the problem of distance is solved if the transmission powers of the moving stations are controlled only in the up-lines.

In a communication apparatus of a communication method other than the spectrum diffusion communication, power consumption can be saved by controlling a transmission power in accordance with a distance to a receiving station. Namely, for a receiving station at a short distance, a smaller transmission power than a maximum transmission power is used so that the transmission power is saved compared to a case where a large transmission power is always used. Since unduly high power is not used, undue disturbance of other communication can be avoided.

Figure 7:
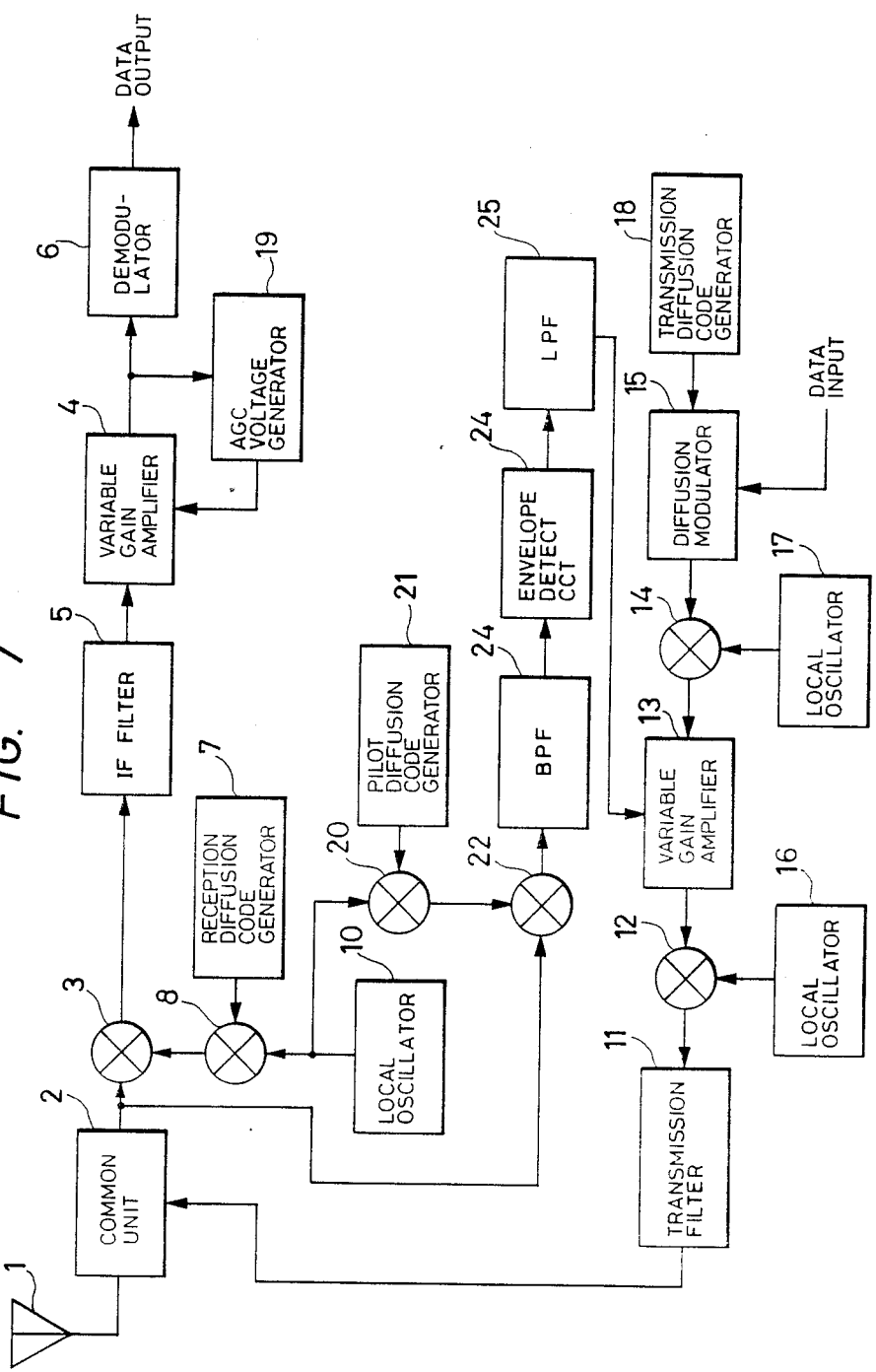
FIG. 7 shows a block diagram of another embodiment of the present invention.

FIG. 7 shows a block diagram of an embodiment in which moving stations control the transmission powers in accordance with a pilot signal sent from the fixed station.

In the present embodiment, in order to control the gain of the transmitter variable gain amplifier 13, circuits 20-25 are provided. Numeral 20 denotes a mixer which multiplies the output of the receiver local oscillator 10 with the output of a pilot diffusion (spread) code generator 21 and supplies a product to a correlator 22. A received signal branched by the common unit 2 is applied to another input of the correlator 22.

The pilot diffusion code generator 21 generates a diffusion code corresponding to the pilot diffusion signal normally sent from the multi-connection apparatus. The output of the correlator 22 is supplied to a band pass filter 23 which eliminates unnecessary frequency components from the correlated signal. The output of the band pass filter 23 is supplied to an envelope detector 24, which envelope-detects an input signal. The detected signal is applied to a low pass filter 25 which comprises an integrator and filters the input signal to produce a voltage signal proportional to a received electric field strength of the pilot signal.

When two (or more) moving stations configured as shown in FIG. 7 are multi-connected to the multi-connection apparatus which is a single fixed station, the fixed station normally sends a pilot signal diffused by a specific diffusion code. This pilot signal may be common to the plurality of moving stations. The multi-connection apparatus of the present embodiment needs to send only one pilot signal in addition to the signals sent by the conventional multi-connection apparatus. Since this signal is sent even when the communication is not established, the moving station having the configuration shown in FIG. 7 can normally receive the pilot diffusion signal. Accordingly, the gain of the transmitter variable gain amplifier 13 is always set such that the received power at the fixed station is kept at a proper level. The circuits 20-22 of FIG. 7 reverse-diffuse the pilot diffusion signal to convert the pilot diffusion signal to the intermediate frequency signal. The pilot signal is envelope-detected by the detector 24 and the output of the detector 24 is supplied to a low pass filter 25 which converts it to a time-averaged signal of a voltage signal proportional to the received electric field strength of the pilot signal. The output of the low pass filter 25 is supplied to the variable gain amplifier 13 which controls the transmission power of the moving station in accordance with the received electric field strength of the pilot signal at the moving station. As a result, the received electric field strength at the fixed station is properly controlled.

In this manner, the distance to the other station is determined based on the received power and the transmission power is controlled in accordance with the received voltage so that the transmission power is low if the other station is at a short distance. If the other station is at a distant place, the transmission power is high. As a result, the received power of the other station can be limited in a proper range and tho problem of distance is solved.

When the pilot signal can be always received, the system is more reliable.

Accordingly, the spectrum diffusion communication among a number of communication apparatus by the multi-connection is attained.

While preferred embodiments of the present invention have been described, the present invention is not limited to those embodiments but various modifications thereof may be made without departing from the scope of claims.

I claim:

1. A spectrum diffusion communication apparatus comprising:
   receiving means for receiving a signal;

receiving conversion means for converting the signal received by said receiving means in accordance with a first diffusion code, said first diffusion code being determined on the basis of a diffusion code used in transmission by a partner station;

control signal generating means for generating a control signal corresponding to a level of the output of said receiving conversion means;

transmission conversion means for converting data to be transmitted in accordance with a second diffusion code;

transmission means for transmitting the output of said transmission conversion means to the partner station; and transmission control means for controlling a transmission level of said transmission means in accordance with the control signal generated by said control signal generating means.

2. A spectrum diffusion communication apparatus according to claim 1, wherein said receiving means receives a radio signal.

3. A spectrum diffusion communication apparatus according to claim 1, wherein said transmission means transmits a radio signal.

4. A spectrum diffusion communication apparatus according to claim 1, wherein said transmission control means controls the transmission level of said transmission means such that the transmission level of said transmission means is inversely proportional to the output level of said receiving means.

5. A spectrum diffusion communication apparatus according to claim 1 further comprising:

demodulation means for demodulating source data from the output of said receiving conversion means; and demodulation control means for controlling an output level of said demodulation means in accordance with the control signal generated by said control signal generation means.

6. A spectrum diffusion communication apparatus according to claim 1 further comprising:

amplifier means for amplifying the output of said receiving conversion means; and amplification control means for controlling an amplification factor of said amplifier means in accordance with the control signal generated by said control means.

7. A spectrum diffusion communication apparatus according to claim 5, wherein said demodulation control means controls said demodulation means to keep the output level thereof constant.

8. A spectrum diffusion communication apparatus according to claim 6, wherein said amplification control means controls the amplification factor of said amplifier means to keep the output level thereof constant.

9. A spectrum diffusion communication apparatus comprising:

receiving means for receiving a signal;

first conversion means for converting the signal received by said receiving means in accordance with a first diffusion code, said first diffusion code being determined on the basis of a diffusion code used in transmission by a partner station;

control signal generating means for generating a control signal corresponding to an output level of said first conversion means;

second conversion means for converting the signal received by said receiving means in accordance with a second diffusion code, said second diffusion code being determined on the basis of another diffusion code used in transmission by the partner station;

demodulation means for demodulating source data from the output of said second conversion means;

third conversion means for correlating data to be transmitted to a third diffusion code;

transmission means for transmitting the output of said third conversion means to the partner station; and transmission control means for controlling a transmission level of said transmission means in accordance with the control signal generated by said control signal generating means.

10. A spectrum diffusion communication apparatus according to claim 9, wherein said receiving means receives a radio signal.

11. A spectrum diffusion communication apparatus according to claim 9, wherein said transmission means transmits a radio signal.

12. A spectrum diffusion communication apparatus according to claim 9 wherein said transmission control means controls the transmission level of said transmission means such that the transmission level of said transmission means is inversely proportional to the output level of said receiving means.

13. A spectrum diffusion communication apparatus according to claim 9 further comprising:

demodulation control means for controlling an output level of said demodulation means in accordance with the control signal generated by said control signal generating means.

14. A spectrum diffusion communication apparatus according to claim 13, wherein said demodulation control means controls said demodulation means to keep the output level thereof constant.

15. A spectrum diffusion communication apparatus according to claim 9, wherein the first diffusion code is a diffusion code used, in transmission of level control signal, by said partner station, and the second diffusion code is a diffusion code used for data transmission by said partner station.

* * * * *

UNITED STATES PATENT AND TRADEMARK OFFICE
CERTIFICATE OF CORRECTION

PATENT NO. : 4,958,359
DATED : September 18, 1990
INVENTOR(S) : ICHIRO KATO

It is certified that error appears in the above-identified patent and that said Letters Patent is hereby corrected as shown below: Title page:

AT [56] REFERENCES CITED

U.S. Patent Documents,
        "Puckett" should read --Puckette--.

AT [57] ABSTRACT

Line 5, "converter" should read --convertor--.

COLUMN 1

Line 28, "by   in" should read --by ①in--.

Line 29, "by   in" should read --by ①in--.

Figure 1:
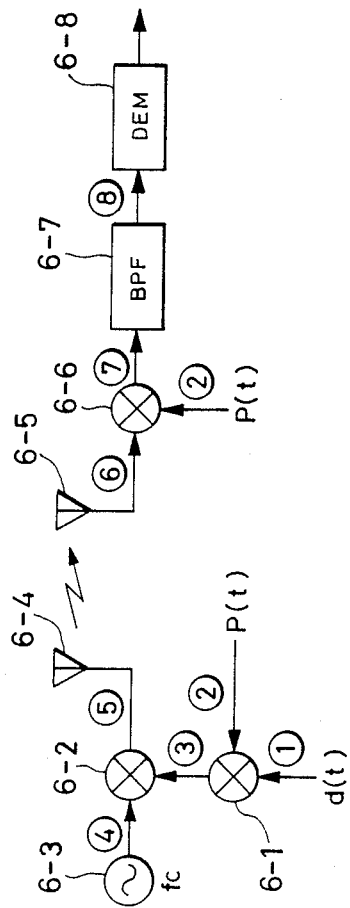
FIG. 1 shows a block diagram of a spectrum diffusion communication apparatus.
Figure 2:
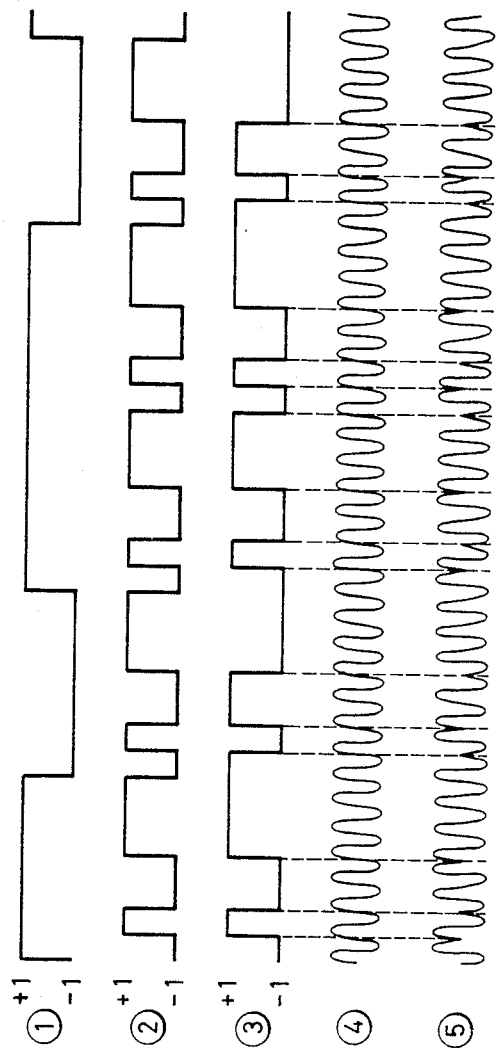
FIGS. 2 and 3 show waveforms and spectra of outputs of respective components of the spectrum diffusion communication apparatus.
Figure 3:
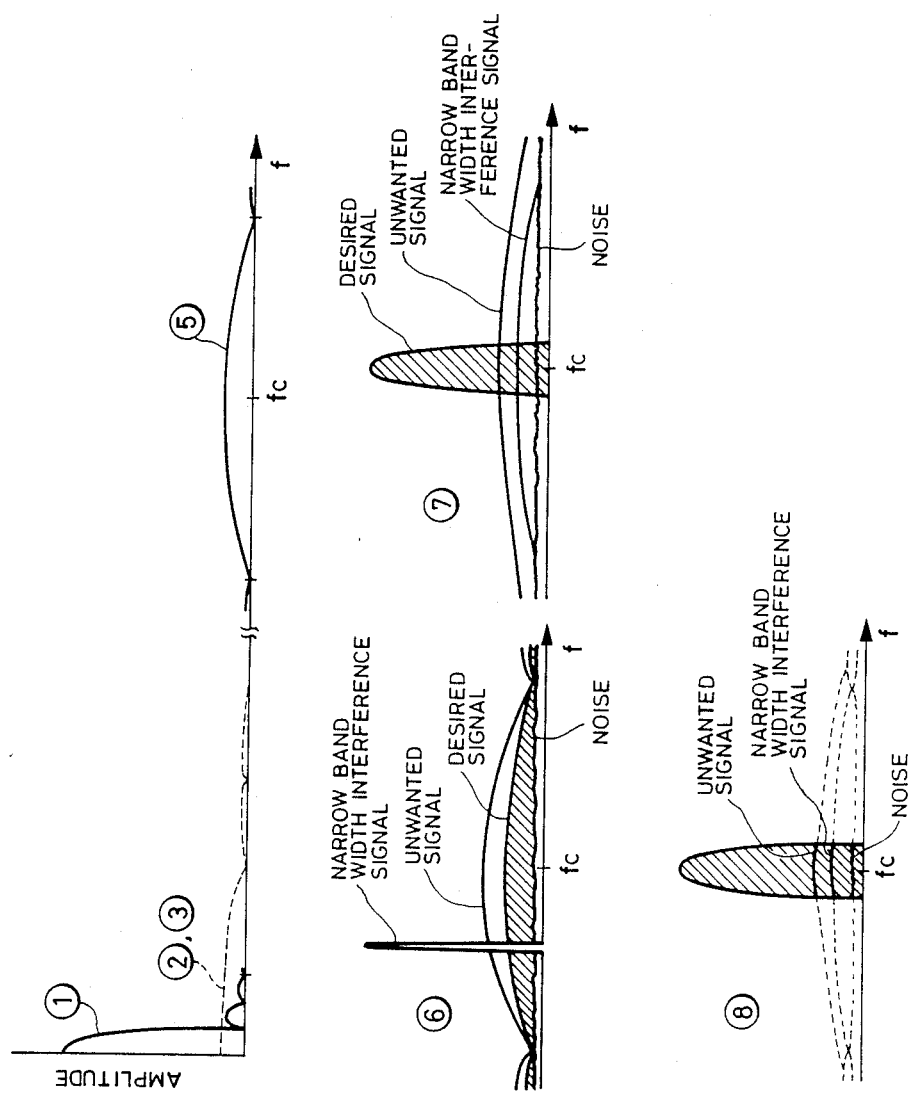

Line 32, "   in FIG. 2" should read --②in FIG. 2--
        and
        "by   in" should read --by ②in--.

Line 34, "spectrum   in" should read --spectrum ②in--.

Line 35, "spectrum   ." should read --spectrum ③.--.

Line 39, "by   in" should read --by ③in--.

Line 40, "   in" should read --③in--.

Line 41, "spectrum   ." should read --spectrum ②.--.

Line 44, "by   in" should read --by ④in--.

Line 45, "by   in" should read --by ⑤in--.

UNITED STATES PATENT AND TRADEMARK OFFICE
CERTIFICATE OF CORRECTION

PATENT NO. : 4,958,359
DATED : September 18, 1990
INVENTOR(S) : ICHIRO KATO

It is certified that error appears in the above-identified patent and that said Letters Patent is hereby corrected as shown below:

Line 46, "by   in" should read --by ⑤ in--.

Line 51, "by   in" should read --by ⑥ in--.

Line 57, "by   in" should read --by ⑦ in--.

COLUMN 2

Line 11, "by   in" should read --by ⑧ in--.

Line 46, "multi" should read --multi---.

COLUMN 3

Line 16, "frequency converted" should read

--frequency-converted--.

UNITED STATES PATENT AND TRADEMARK OFFICE
CERTIFICATE OF CORRECTION

PATENT NO. : 4,958,359

DATED : September 18, 1990

INVENTOR(S) : ICHIRO KATO

It is certified that error appears in the above-identified patent and that said Letters Patent is hereby corrected as shown below:

COLUMN 6

Line 53, "tho" should read --the--.

COLUMN 8

Line 35, "claim 9 " should read --claim 9,--.

Signed and Sealed this

Fourth Day of August, 1992

Attest:

DOUGLAS B. COMER

Attesting Officer

Acting Commissioner of Patents and Trademarks